(12) United States Patent
Fujii

(10) Patent No.: US 7,835,338 B2
(45) Date of Patent: Nov. 16, 2010

(54) COMMUNICATION SYSTEM, COMMUNICATION DEVICE, WIRED COMMUNICATION DEVICE, AND COMMUNICATION METHOD

(75) Inventor: Kunihide Fujii, Tokyo (JP)

(73) Assignee: Sony Corporation, Tokyo (JP)

( * ) Notice: Subject to any disclaimer, the term of this patent is extended or adjusted under 35 U.S.C. 154(b) by 676 days.

(21) Appl. No.: 11/369,795

(22) Filed: Mar. 6, 2006

(65) Prior Publication Data

US 2006/0198364 A1    Sep. 7, 2006

(30) Foreign Application Priority Data

Mar. 7, 2005    (JP)    ............................ P2005-062418

(51) Int. Cl.
*G06K 5/00*    (2006.01)
*H04B 5/00*    (2006.01)

(52) U.S. Cl. ...................... 370/343; 235/380; 455/41.1

(58) Field of Classification Search ................ 370/464, 370/465, 310, 335, 338, 343, 352, 395.4, 370/401, 445, 463, 475; 235/375–386, 441, 235/440, 439, 451, 487, 492, 493, 436; 455/39, 455/41.1–41.3, 42, 500, 501, 502, 557, 558, 455/550.1, 47, 48, 63.1, 73, 74.1, 78, 84, 455/91, 108, 183.1, 200.1, 260, 556.1

See application file for complete search history.

(56) References Cited

U.S. PATENT DOCUMENTS

| | | | |
|---|---|---|---|
| 5,717,737 A | | 2/1998 | Doviak et al. |
| 6,282,407 B1 * | | 8/2001 | Vega et al. ................ 455/41.1 |
| 6,776,339 B2 * | | 8/2004 | Piikivi ....................... 235/451 |
| 7,003,671 B1 * | | 2/2006 | Kusakabe et al. ........... 713/189 |
| 7,240,846 B2 * | | 7/2007 | Arisawa et al. ............. 235/492 |
| 7,248,892 B2 * | | 7/2007 | White et al. ............. 455/550.1 |
| 7,364,083 B2 * | | 4/2008 | Ogawa et al. ............... 235/487 |

(Continued)

FOREIGN PATENT DOCUMENTS

JP    04-123532    4/1992

(Continued)

OTHER PUBLICATIONS

"Information Technology Telecommunications and Information Exchange between Systems Near field Communication Interface and Protocol (NFCIP-1)", First Edition Apr. 1, 2004, ISO/IEC 18092:2004(E).

(Continued)

*Primary Examiner*—Aung S Moe
*Assistant Examiner*—Prince Mensah
(74) *Attorney, Agent, or Firm*—K&L Gates LLP

(57) ABSTRACT

A communication system includes a wired communication device and a communication device that can communicate with a wireless communication device and the wired communication device. The communication device includes a clock output unit and a modulator. The wired communication device includes a clock extracting unit, a signal extracting unit, and a processing unit. The communication device and the wired communication device are connected to each other by a first connecting line through which a modulated signal is sent from the communication device to the wired communication device, and a second connecting line, which is different from the first connecting line, through which a signal is sent from the wired communication device to the communication device.

6 Claims, 10 Drawing Sheets

U.S. PATENT DOCUMENTS

| | | |
|---|---|---|
| 2002/0044536 A1 | 4/2002 | Izumi et al. |
| 2005/0077356 A1 | 4/2005 | Takayama et al. |
| 2005/0085226 A1* | 4/2005 | Zalewski et al. ......... 455/426.1 |
| 2006/0192007 A1* | 8/2006 | Ide .............................. 235/451 |

FOREIGN PATENT DOCUMENTS

| | | |
|---|---|---|
| JP | 2002-351623 | 12/2002 |
| JP | 2004-215225 | 7/2004 |
| WO | 00/42797 | 7/2000 |
| WO | WO2005/041119 | 5/2005 |

OTHER PUBLICATIONS

Austrian Written Opinion dated Aug. 22, 2008.

* cited by examiner

FIG. 1
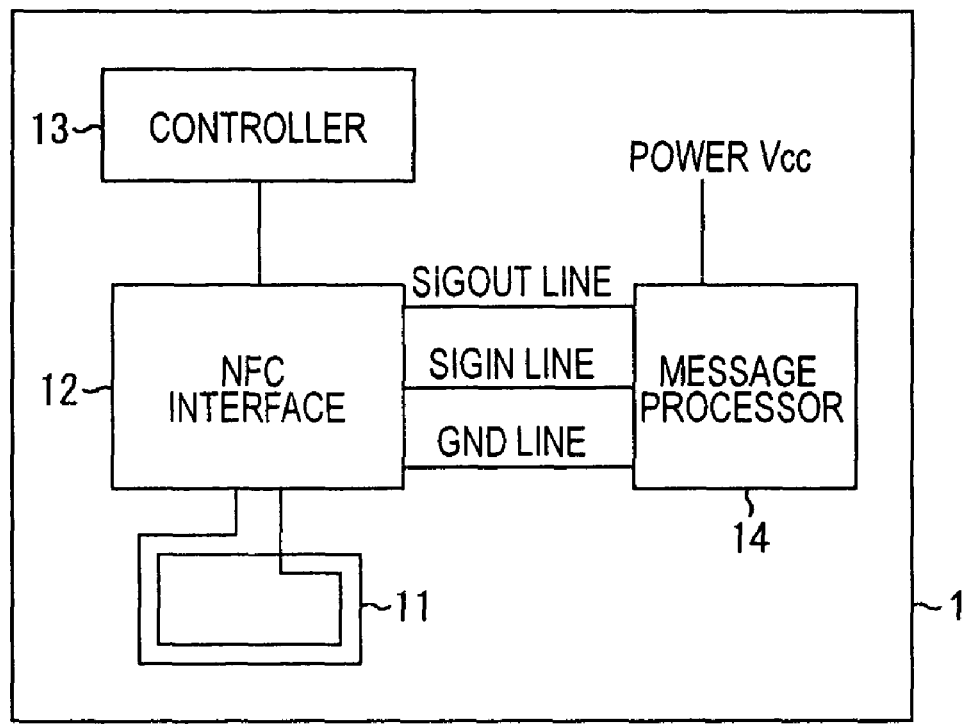
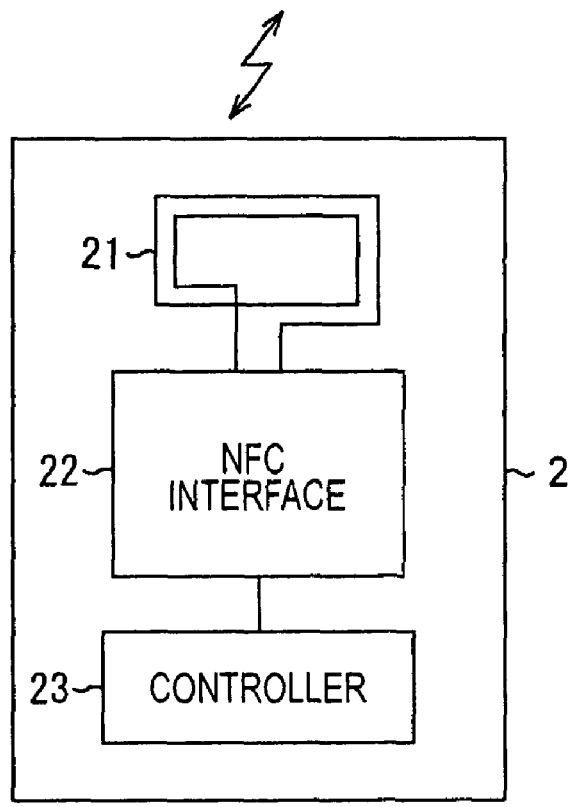

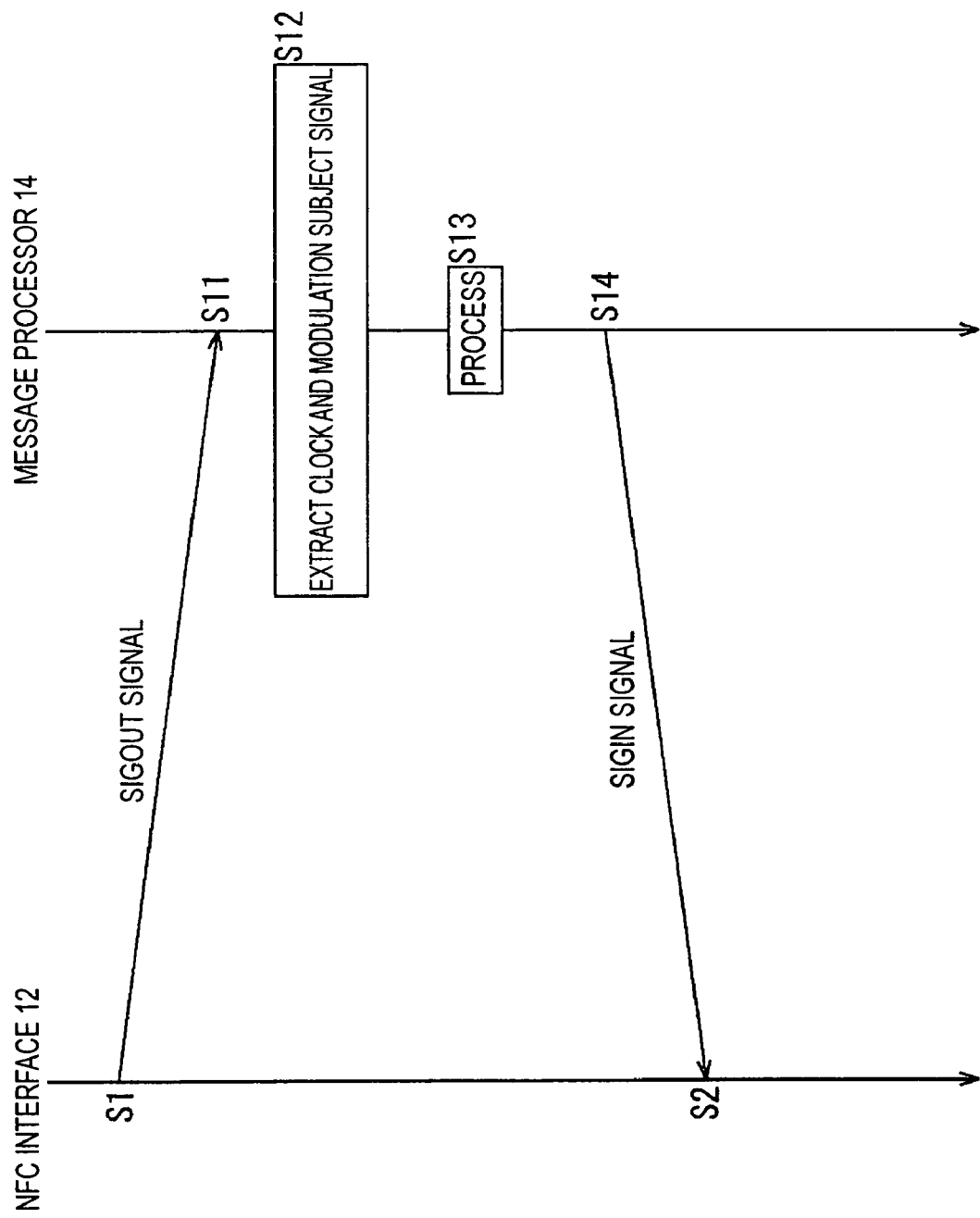

COMMUNICATION SYSTEM, COMMUNICATION DEVICE, WIRED COMMUNICATION DEVICE, AND COMMUNICATION METHOD

CROSS REFERENCES TO RELATED APPLICATIONS

The present application claims priority to Japanese Patent Application JP 2005-062418 filed in the Japanese Patent Office on Mar. 7, 2005, the entire contents of which are incorporated herein by reference.

BACKGROUND

The present invention relates to communication systems, communication devices, wired communication devices, and communication methods. More particularly, the invention relates to a communication system, a communication device, a wired communication device, and a communication method that can perform wired communication with a simple configuration of the devices by minimizing the number of lines for connecting the devices.

Integrated circuit (IC) cards that can perform near field communication, which is one type of wireless communication, are coming into widespread use because of its utility. Such IC cards that perform near field communication are used in, for example, an automatic ticketing system in a station or an electronic settlement system that conducts settlement by using e-money.

Due to the spread of near field communication IC cards, the standardization of near field communication protocols that can be used by IC cards is in progress. A typical example of such communication protocols is Near Field Communication Interface and Protocol (NFCIP)-1, which is defined as ISO/IEC 18092.

NFCIP-1 defines two communication modes, i.e., an active mode and a passive mode. In the active mode, to send data, a plurality of communication devices each output electromagnetic waves and modulate them by themselves. In the passive mode, to send data, one of a plurality of communication devices outputs electromagnetic waves and modulates them, and another communication device receives the electromagnetic waves and performs load modulation on them. Communication devices based on NFCIP-1 perform communication either in the active mode or the passive mode (see, for example, Japanese Unexamined Patent Application Publication No. 2004-215225 and "Information Technology Telecommunications and Information Exchange between Systems Near field Communication Interface and Protocol (NFCIP-1)", First Edition 2004-04-01, ISO/IEC 18092:2004 (E)).

In addition to IC cards, cellular telephones are now widely used, and a device integrating an IC card and a cellular telephone therein, i.e., a cellular telephone having a built-in IC card that performs near field communication, is already put to practical use. More precisely, a cellular telephone integrates an IC chip rather than an IC card therein, that is, the shapes of the IC card and the IC chip are different although the functions thereof are similar. For the convenience of description, however, IC chips having functions similar to those of IC cards are also referred to as "IC cards".

Some cellular telephones are designed to allow users to install and remove subscriber identity module (SIM) cards (which include SIM chips) storing subscriber information (for example, telephone numbers) necessary for the users to use the cellular telephones. Such cellar telephones are hereinafter referred to as "SIM-compatible cellular telephones".

If the user replaces a currently used SIM-compatible cellular telephone by another SIM-compatible cellular telephone, he/she can remove the SIM card from the old one to insert it into the new one to use the new cellular telephone.

As the standards superior to SIM, user identity module (UIM) is available. UIM cards (which include UIM chips) can handle, not only user subscriber information, but also personal information, such as credit card numbers and authentication information used for conducting authentication. SIM cards and UIM cards are defined in ISO7816.

SIM cards or UIM cards have terminals (pins) for performing wired communication with other devices to send and receive signals. When a SIM card or a UIM card is installed in a cellular telephone, the terminals of the SIM card or the UIM card are brought into contact with the terminals of the cellular telephone so that the circuit in the cellular telephone can send and receive signals to and from the SIM card or the UIM card by wired communication.

It is necessary that SIM cards or UIM cards be small since they are installed in portable machines, such as cellular telephones. Accordingly, only a small number of terminals, for example, about 8 terminals, are provided for sending and receiving signals to and from other devices, and some of the terminals are used for sending and receiving signals to and from the circuit in a cellular telephone.

As discussed above, currently, there are two types of cellular telephones, i.e., one type of which has a built-in IC card that performs near field communication, and the other type of which allows users to install and remove SIM cards or UIM cards (hereinafter simply referred to as "SIM cards"). It can be therefore expected that cellular telephones having built-in IC cards that perform near field communication and are compatible with SIM cards will be put to practical use and become popular.

In such cellular telephones, a communication interface used for performing near field communication by using an IC card is probably used for sending and receiving signals between a built-in SIM card and external devices.

In this case, it is necessary that such a near field communication interface be connected with the SIM card by physical lines (wires).

As stated above, however, only a small number of terminals are provided for the SIM card and some of them are already used. Accordingly, it is necessary to minimize the number of physical lines for connecting the near field communication interface with the SIM card.

On the other hand, if the number of lines is reduced, it is necessary that signals be sent and received with such a small number of lines, which increases the complexity of the communication interface and the SIM card.

More specifically, if signals are sent from the communication interface to the SIM card and also from the SIM card to the communication interface by using only one connecting line, it is necessary to change the impedance (impedance when viewed from an external source) in the communication interface or the SIM card between when a signal is sent and when a signal is received. Impedance changes further change voltages or currents, in which case, the detection of signals (for example, detecting the levels of received signals) should be performed by precisely considering such voltage or current changes. Additionally, when the SIM card is installed in a cellular telephone, the impedance when viewed from one of the communication interface and the SIM card to the other one may be changed depending on the condition of contact between the terminals of the cellular telephone and those of the SIM card. It is thus necessary to design the communication interface and the SIM card to cope with the above-described impedance changes or voltage or current changes. Thus, the configuration of the communication interface and the SIM card become complicated.

As the configuration of the communication interface or the SIM card becomes complicated, the size thereof is also increased. This is not preferable since the communication interface and the SIM card, in particular, the SIM card, should be small, as discussed above.

SUMMARY

It is thus desirable to perform wired communication between a wired communication device, such as a SIM card, and a communication device, such as a communication interface for an IC card, that can perform both wireless communication and wired communication, with a simple configuration of the devices by minimizing the number of lines for connecting the devices.

According to an embodiment of the present invention, there is provided a communication system including a wired communication device that performs wired communication, and a communication device that can communicate with both a wireless communication device that performs wireless communication and the wired communication device. The communication device includes a clock output unit operable to output a clock to be supplied to the wired communication device, and a modulator operable to perform amplitude shift keying (ASK) modulation on the clock by using a signal corresponding to data to be sent to the wired communication device as a modulation subject signal and to output a resulting modulated signal. The wired communication device includes a clock extracting unit operable to extract the clock from the modulated signal, a signal extracting unit operable to extract the modulation subject signal from the modulated signal, and a processing unit operable to process the modulation subject signal extracted by the signal extracting unit in accordance with the clock extracted by the clock extracting unit and also to output a signal corresponding to data to be sent to the communication device. The communication device and the wired communication device are connected to each other by a first connecting line through which the modulated signal output from the modulator is sent from the communication device to the wired communication device, and a second connecting line, which is different from the first connecting line, through which the signal output from the processing unit is sent from the wired communication device to the communication device.

The system is a logical set of a plurality of devices, and it is not necessary that the devices be located in the same housing.

According to another embodiment of the present invention, there is provided a communication device that can communicate with both a wireless communication device that performs wireless communication and a wired communication device that performs wired communication. The communication device includes a clock output unit operable to output a clock to be supplied to the wired communication device, and a modulator operable to perform ASK modulation on the clock by using a signal corresponding to data to be sent to the wired communication device as a modulation subject signal and to output a resulting modulated signal. The communication device is connected to the wired communication device by a first connecting line through which the modulated signal output from the modulator is sent from the communication device to the wired communication device, and a second connecting line, which is different from the first connecting line, through which a signal corresponding to data to be sent from the wired communication device to the communication device is sent from the wired communication device to the communication device.

According to another embodiment of the present invention, there is provided a first communication method for a communication device that can communicate with both a wireless communication device that performs wireless communication and a wired communication device that performs wired communication. The first communication method includes the steps of performing ASK modulation on a clock by a modulation subject signal to output a resulting modulated signal by using a modulator, sending the modulated signal to the wired communication device through a first connecting line through which the modulated signal output from the modulator is sent from the communication device to the wired communication device, and receiving the signal sent from the wired communication device through a second connecting line, which is different from the first connecting line, through which a signal corresponding to data to be sent from the wired communication device to the communication device is sent from the wired communication device to the communication device.

According to another embodiment of the present invention, there is provided a wired communication device that performs wired communication with a communication device that can communicate with both a wireless communication device that performs wireless communication and the wired communication device. The wired communication device includes a clock extracting unit operable to extract a clock from a modulated signal which is obtained by performing ASK modulation on the clock by using a signal corresponding to data as a modulation subject signal and which is sent from the communication device, a signal extracting unit operable to extract the modulation subject signal from the modulated signal, and a processing unit operable to process the modulation subject signal extracted by the signal extracting unit in accordance with the clock extracted by the clock extracting unit and also to output a signal corresponding to data to be sent to the communication device. The wired communication device is connected to the communication device by a first connecting line through which the modulated signal output from the communication device is sent from the communication device to the wired communication device and a second connecting line, which is different from the first connecting line, through which the signal output from the processing unit is sent from the wired communication device to the communication device.

According to another embodiment of the present invention, there is provided a second communication method for a wired communication device that performs wired communication with a communication device that can communicate with both a wireless communication device that performs wireless communication and the wired communication device. The second communication method includes the steps of receiving a modulated signal from the communication device by the wired communication device through a first connecting line through which the modulated signal output from the communication device is sent, extracting the clock from the modulated signal by a clock extracting unit and extracting the modulation subject signal from the modulated signal by a signal extracting unit, and sending the signal output from a processing unit from the wired communication device to the communication device through a second connecting line, which is different from the first connecting line, through which the signal output from the processor is sent.

Accordingly, in an embodiment of the present invention, a modulated signal obtained by performing ASK modulation on a clock by a modulation subject signal is sent from the communication device to the wired communication device through the first connecting line, and a signal output from the processor is sent from the wired communication device to the communication device through the second connecting line.

According to an embodiment of the present invention, wired communication can be performed with a simple device configuration by minimizing the number of lines connecting the devices.

Additional features and advantages are described herein, and will be apparent from, the following Detailed Description and the figures.

BRIEF DESCRIPTION OF THE FIGURES

FIG. 1 is a block diagram illustrating an example of the configuration of a communication system according to an embodiment of the present invention.

FIG. 10 illustrates wired communication between the NFC interface and the message processor.

DETAILED DESCRIPTION

Figure 2:
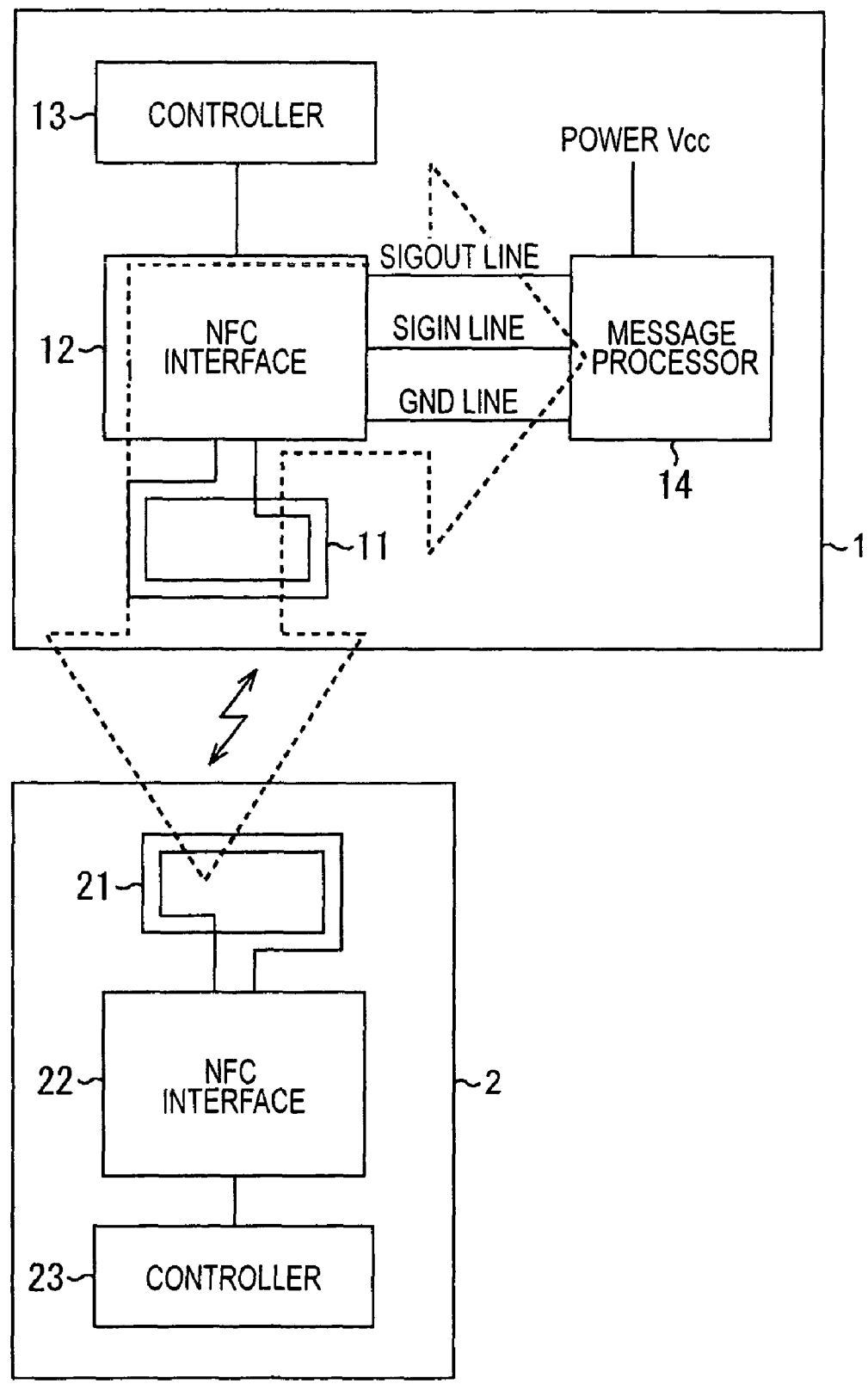
FIG. 2 illustrates sending and receiving of data between a message processor and a wireless communication device.

The communication system according to an embodiment of the present invention includes a wired communication device (for example, a message processor 14 shown in FIG. 1) that performs wired communication and a communication device (an NFC interface 12 shown in FIG. 1) that is capable of communicating with both a wireless communication device (for example, a wireless communication device 2 shown in FIG. 1) that performs wireless communication and the wired communication device. The communication device includes a clock output unit (for example, a clock selector 46 shown in FIG. 4) operable to output a clock to be supplied to the wired communication device, and a modulator (for example, a modulator 47 shown in FIG. 4) operable to perform ASK modulation on the clock by using a signal corresponding to data to be sent to the wired communication device as a modulation subject signal and to output a resulting modulated signal. The wired communication device including a clock extracting unit (for example, a clock extracting unit 52 shown in FIG. 4) operable to extract the clock from the modulated signal, a signal extracting unit (for example, a signal extracting unit 53 shown in FIG. 4) operable to extract the modulation subject signal from the modulated signal, and a processing unit (a processing unit shown in FIG. 54 shown in FIG. 4) operable to process the modulation subject signal extracted by the signal extracting unit in accordance with the clock extracted by the clock extracting unit and also to output a signal corresponding to data to be sent to the communication device. The communication device and the wired communication device are connected to each other by a first connecting line (for example, a SIGOUT line shown in FIG. 1) through which the modulated signal output from the modulator is sent from the communication device to the wired communication device and a second connecting line (for example, a SIGIN line shown in FIG. 1), which is different from the first connecting line, through which the signal output from the processing unit is sent from the wired communication device to the communication device.

The communication device (for example, the NFC interface 12 shown in FIG. 1) according to an embodiment of the present invention can communicate with both a wireless communication device (for example, the wireless communication device 2 shown in FIG. 1) that performs wireless communication and a wired communication device (for example, the message processor 14 shown in FIG. 1) that performs wired communication. The communication device includes a clock output unit (for example, the clock selector 46 shown in FIG. 4) operable to output a clock to be supplied to the wired communication device, and a modulator (for example, the modulator 47 shown in FIG. 4) operable to perform ASK modulation on the clock by using a signal corresponding to data to be sent to the wired communication device as a modulation subject signal and to output a resulting modulated signal. The communication device is connected to the wired communication device by a first connecting line (for example, the SIGOUT line shown in FIG. 1) through which the modulated signal output from the modulator is sent from the communication device to the wired communication device, and a second connecting line (for example, the SIGIN line shown in FIG. 1), which is different from the first connecting line, through which a signal corresponding to data to be sent from the wired communication device to the communication device is sent from the wired communication device to the communication device.

The first communication method according to an embodiment of the present invention is used for a communication device (for example, the NFC interface 12 shown in FIG. 1) that can communicate with both a wireless communication device (for example, the wireless communication device 2 shown in FIG. 1) that performs wireless communication and a wired communication device (for example, the message processor 14 shown in FIG. 1) that performs wired communication. The communication device includes a clock output unit (for example, the clock selector 46 shown in FIG. 4) operable to output a clock to be supplied to the wired communication device, and a modulator (for example, the modulator 47 shown in FIG. 4) operable to perform ASK modulation on the clock by using a signal corresponding to data to be sent to the wired communication device as a modulation subject signal and to output a modulated signal. The first communication method includes the steps of performing ASK modulation on the clock by the modulation subject signal to output the modulated signal by using the modulator, sending the modulated signal to the wired communication device through a first connecting line (for example, the SIGOUT line shown in FIG. 1) through which the modulated signal output from the modulator is sent from the communication device to the wired communication device, and receiving the signal sent from the wired communication device through a second connecting line (for example, the SIGIN line shown in FIG. 1), which is different from the first connecting line, through which a signal corresponding to data to be sent from the wired communication device to the communication device is sent from the wired communication device to the communication device.

The wired communication device (for example, the message processor 14 shown in FIG. 1) according to an embodiment of the present invention performs wired communication with a communication device (for example, the NFC interface 12 shown in FIG. 1) that can communicate with both a wireless communication device (for example, the wireless communication device 2 shown in FIG. 1) that performs wireless communication and the wired communication device. The wired communication device includes a clock extracting unit (the clock extracting unit 52 shown in FIG. 4) operable to extract a clock from a modulated signal which is obtained by performing ASK modulation on the clock by using a signal corresponding to data as a modulation subject signal and which is sent from the communication device, a signal extracting unit (for example, the signal extracting unit 53 shown in FIG. 4) operable to extract the modulation subject signal from the modulated signal, and a processing unit (for example, the processing unit 54 shown in FIG. 4) operable to process the modulation subject signal extracted by the signal extracting unit in accordance with the clock extracted by the clock extracting unit and also to output a signal corresponding to data to be sent to the communication device. The wired communication device is connected to the communication device by a first connecting line (for example, the SIGOUT line shown in FIG. 1) through which the modulated signal output from the communication device is sent from the communication device to the wired communication device, and a second connecting line (the SIGIN signal shown in FIG. 1), which is different from the first connecting line, through which the signal output from the processing unit is sent from the wired communication device to the communication device.

The second communication method according to an embodiment of the present invention is used for a wired communication device (for example, the message processor 14 shown in FIG. 1) that performs wired communication with a communication device (for example, the NFC interface 12 shown in FIG. 1) that can communicate with both a wireless communication device (for example, the wireless communication device 2 shown in FIG. 1) that performs wireless communication and the wired communication device. The wired communication device includes a clock extracting unit (for example, the clock extracting unit 52 shown in FIG. 4) operable to extract a clock from a modulated signal which is obtained by performing ASK modulation on the clock by using a signal corresponding to data as a modulation subject signal and which is sent from the communication device, a signal extracting unit (for example, the signal extracting unit 53 shown in FIG. 4) operable to extract the modulation subject signal from the modulated signal, and a processing unit (for example, the processing unit 54 shown in FIG. 4) operable to process the modulation subject signal extracted by the signal extracting unit in accordance with the clock extracted by the clock extracting unit and also to output a signal corresponding to data to be sent to the communication device. The second communication method includes the steps of receiving the modulated signal from the communication device by the wired communication device through a first connecting line (for example, the SIGOUT line shown in FIG. 1) through which the modulated signal output from the communication device is sent, extracting the clock from the modulated signal by the clock extracting unit and extracting the modulation subject signal from the modulated signal by the signal extracting unit, and sending the signal output from the processing unit from the wired communication device to the communication device through a second connecting line (for example, the SIGIN line shown in FIG. 1), which is different from the first connecting line, through which the signal output from the processor is sent.

An embodiment of the present invention is described below with reference to the accompanying drawings.

FIG. 1 illustrates the configuration of a communication system according to an embodiment of the present invention.

The communication system includes a cellular telephone 1 and a wireless communication device 2 between which wireless communication can be performed.

That is, both the cellular telephone 1 and the wireless communication device 2 are configured as devices that perform near field communication in conformity with NFCIP-1 as wireless communication (hereinafter such devices are sometimes referred to as "NFC devices").

NFC devices can perform near field communication (NFC) based on electromagnetic induction with other NFC devices by using a carrier wave having a single frequency, such as 13.56 MHz in the Industrial Scientific Medical (ISM) band.

Near field communication is communication that can be performed between devices located away from each other at a distance within several tens of centimeters, and includes communication that is performed between devices (or casings accommodating the devices therein) in contact with each other.

NFC devices can perform near field communication in two communication modes, i.e., the passive mode and the active mode, as stated above. It is now assumed that two NFC devices (first and second NFC devices) are communicating with each other. In the passive mode, the first NFC device generates electromagnetic waves and modulates a carrier wave corresponding to the electromagnetic waves to send data to the second NFC device. The second NFC device receives the carrier wave from the first NFC device and performs load modulation on it to send data to the first NFC device.

In the active mode, the two NFC devices each generate electromagnetic waves and modulate a carrier wave corresponding to the electromagnetic waves to send data.

In near field communication based on electromagnetic induction, an NFC device that starts communication by first outputting electromagnetic waves, i.e., an NFC device that takes the initiative in communication, is referred to as an "initiator". In near field communication, the initiator sends a command to the other communicating device, and the communicating device returns a response to the command to the initiator. The communicating device that returns a response is referred to as a "target".

If one of the two NFC devices outputs electromagnetic waves to start communication with the other NFC device, the first NFC device is the initiator, and the other NFC device is the target.

In the passive mode, the initiator continues outputting electromagnetic waves and modulates them to send data to the target. The target receives the electromagnetic waves from the initiator and performs load modulation on them to send data to the initiator.

In the active mode, the initiator starts to output electromagnetic waves and modulates them to send data to the target. Upon finishing sending the data, the initiator stops outputting electromagnetic waves. Then, the target starts to output electromagnetic waves and modulates them to send data to the initiator. Upon finishing sending the data, the target stops outputting electromagnetic waves.

An NFC device can become the initiator by first outputting electromagnetic waves to start communication. In the active mode, the NFC device outputs electromagnetic waves by itself regardless of whether it is the initiator or the target. Accordingly, it is possible that a plurality of NFC devices simultaneously output electromagnetic waves, in which case, if such NFC devices are located close to each other, a collision occurs and communication is discontinued.

Accordingly, an NFC device checks for a radio frequency (RF) field formed by electromagnetic waves generated from other devices (such as NFC devices), and only when there is no electromagnetic waves from the other devices, the NFC device starts to output electromagnetic waves, thereby avoiding the occurrence of collision. This processing is referred to as RF collision avoidance (RFCA) processing.

In RFCA processing, an NFC device starts to output electromagnetic waves if electromagnetic waves from other devices are not detected for a predetermined continuous period of time, which is determined by using random numbers. This reduces the possibility of a plurality of NFC devices starting outputting electromagnetic waves at the same time.

NFC devices can send data at various transmission rates, such as 106 kilo bit per second (kbps), 212 kbps, and 424 kbps, and can also change the transmission rate while performing communication which is started at another transmission rate.

The cellular telephone 1 and the wireless communication device 2 configured as described above include NFC interfaces 12 and 22, respectively, which serve as interfaces for performing communication in conformity with NFCIP-1.

More specifically, the cellular telephone 1 includes an antenna 11, the NFC interface 12, a controller 13, and a message processor 14.

The antenna 11 forms a closed loop coil, and when a current flowing in the coil is changed, electromagnetic waves are output from the antenna 11. When electromagnetic waves (magnetic fluxes) flowing in the coil, which serves as the antenna 11, are changed, a current flows in the antenna 11. A signal (current) flowing in the antenna 11 is supplied to the NFC interface 12.

The NFC interface 12 is, for example, a one-chip IC, which performs communication in conformity with NFCIP-1, and performs near field communication (wireless communication) with the wireless communication device 2 or another NFC device via the antenna 11.

The NFC interface 12 also serves as an interface that performs wired communication, and is connected to the message processor 14 that performs wired communication by a SIGOUT line (first connecting line), a SIGIN line (second connecting line), and a GND line.

The SIGOUT line is an electrical wire through which a SIGOUT signal, which is described below, is sent from the NFC interface 12 to the message processor 14. The SIGIN line is an electrical wire different from the SIGOUT line, through which a SIGIN signal, which is described below, is sent from the message processor 14 to the NFC interface 12. The GND line is grounded.

The NFC interface 12 sends data (including commands) to the message processor 14 through the SIGOUT line, and receives data from the message processor 14 through the SIGIN line, thereby performing wired communication with the message processor 14.

The NFC interface 12 and the message processor 14 each have terminals to be connected to the SIGOUT line, SIGIN line, and GND line. However, such terminals are not shown for simple representation.

The NFC interface 12 also includes an interface for performing communication (wired communication) with the controller 13 to send and receive various data to and from the controller 13.

The controller 13 controls blocks (not shown) that serve as a cellular telephone unit of the cellular telephone 1. The blocks serving as a cellular telephone include a block having a calling function and a block having a web-browsing and e-mail-forming function.

The message processor 14 processes messages, and more specifically, the message processor 14 performs wired communication (sending and receiving data by using wired means) to receive data, and stores it if necessary. The message processor 14 also reads stored data and sends it by wired communication.

The message processor 14 is connected to the NFC interface 12 through the three connecting lines, i.e., the SIGOUT line, SIGIN line, and GND line. The message processor 14 sends data to the NFC interface 12 through the SIGIN line and receives data from the NFC interface 12 through the SIGOUT line, thereby performing wired communication with the NFC interface 12.

The message processor 14 may be integrated in the cellular telephone 1. Alternatively, the message processor 14 may be hardware that can easily be installed or removed into or from the cellular telephone 1 by a user, in which case, when the message processor 14 is installed in the cellular telephone 1, the terminals (not shown) of the message processor 14 are electrically connected to the SIGOUT line, SIGIN line, and GND line.

The message processor 14 can be formed as a SIM card or a UIM card. In this case, the message processor 14 may have a built-in tamper-resistant secure application module (SAM) that manages e-money or keys used for authentication or encryption of data. In the message processor 14 having a built-in SAM, a portion serving as the SIM card or the UIM card and a portion serving as the SAM may be integrated into a one-chip IC or may be formed as different one-chip ICs.

In the cellular telephone 1 shown in FIG. 1, in addition to the SIGOUT line, SIGIN line, and GND line, a line for supplying power Vcc is connected to the message processor 14, and power Vcc is supplied to the message processor 14 via the power supply line to operate the message processor 14. There is also another line, which is different from the SIGOUT line, SIGIN line, and GND line, for connecting the message processor 14 to the NFC interface 12, and power can be supplied from the NFC interface 12 to the message processor 14 through that line.

The wireless communication device 2 includes an antenna 21, the NFC interface 22, and a controller 23. The antenna 21 and the NFC interface 22 are configured similarly to the antenna 11 and the NFC interface 12, respectively, of the cellular telephone 1.

Since the wireless communication device 2 is not provided with a block corresponding to the message processor 14, the NFC interface 22 may be provided with or without a function serving as an interface that performs wired communication with a block corresponding to the message processor 14.

The controller 23 executes various types of processing. More specifically, if the wireless communication device 2 is a reader/writer of an automatic ticketing machine, the controller 23 controls the NFC interface 22 to read information (such as the expire date and the traveling zone) from an IC card, which serves as a commuter pass, by near field communication when the IC card is located close to the wireless communication device 2, and then checks whether the information concerning the commuter pass is appropriate. If the wireless communication device 2 is an IC card that can conduct electronic settlement, the controller 23 updates the balance of e-money in response to a NFC device (not shown) that stores e-money and requests the controller 23 to conduct electronic settlement.

The wireless communication device 2 may be formed as a reader/writer and a personal computer (PC). In this case, the PC runs an application (program) to implement the controller 23.

The cellular telephone 1 and the wireless communication device 2 configured as described above are both NFC devices so that they can perform near field communication in conformity with NFCIP-1.

That is, the NFC interface 12 of the cellular telephone 1 can perform near field communication with the NFC interface 22 of the wireless communication device 2 in conformity with NFCIP-1.

The NFC interface 12 of the cellular telephone 1 can also perform wired communication with the message processor 14 by being connected thereto through the SIGOUT line, SIGIN line, and GND line. The NFC interface 12 can also perform wired communication (controller communication) with the controller 13.

Thus, according to the communication system shown in FIG. 1, the NFC interface 12 of the cellular telephone 1 can receive data from the NFC interface 22 of the wireless communication device 2 and further sends the data to the message processor 14 through the SIGOUT line by wired communication. The NFC interface 12 can also receive data (for example, data output from the message processor 14 as a response to data sent from the wireless communication device 2 via the NFC interface 12) from the message processor 14 through the SIGIN line by wired communication and further transfers the data to the wireless communication device 2 by wireless communication.

As a result, the message processor 14 and the wireless communication device 2 can send and receive data, as shown in FIG. 2, with each other via the NFC interface 12. Accordingly, if the message processor 14 stores e-money and the wireless communication device 2 conducts electronic settlement, the wireless communication device 2 reads e-money stored in the message processor 14 via the NFC interface 12 to conduct electronic settlement on a product purchased by the user of the cellular telephone 1.

In the communication system shown in FIG. 1, the NFC interface 12 of the cellular telephone 1 can receive data from the controller 13 and further transfers the data to the message processor 14 through the SIGOUT line by wired communication. The NFC interface 12 can also receive data from the message processor 14 through the SIGIN line by wired communication and further transfers the data to the controller 13.

Figure 3:
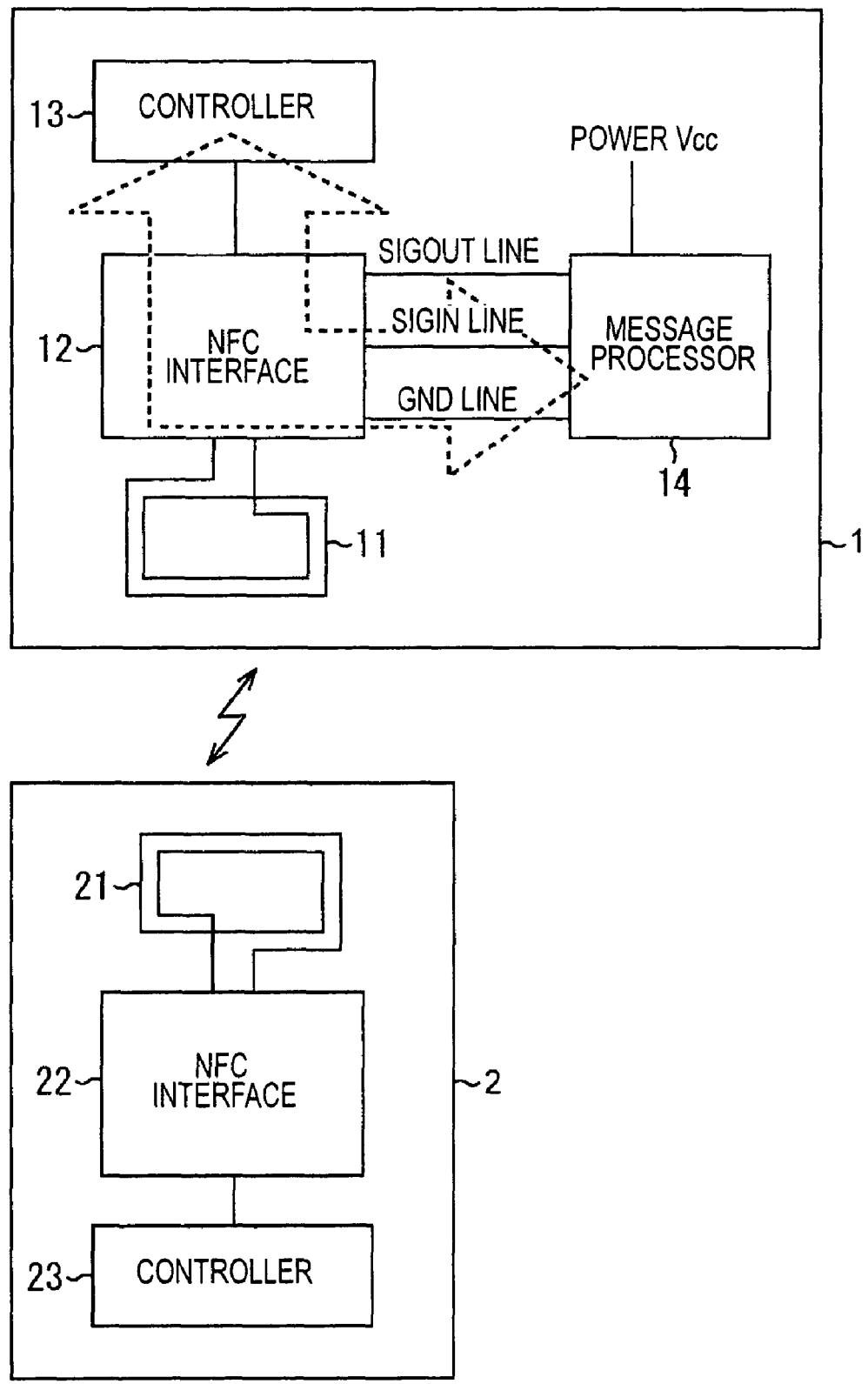
FIG. 3 illustrates sending and receiving of data between a controller and the message processor.

As a result, the controller 13 and the message processor 14 can send and receive data, as shown in FIG. 3, via the NFC interface 12. Accordingly, if the message processor 14 stores e-money, the controller 13 can read the outstanding balance of e-money from the message processor 14 via the NFC interface 12 and displays the balance on a display unit (not shown) of the cellular telephone 1, thereby allowing the user of the cellular telephone 1 to check the balance of e-money.

In the communication system 1, the controller 13 and the wireless communication device 2 can also send and receive data with each other via the NFC interface 12 in a manner similar to sending and receiving of data between the message processor 14 and the wireless communication device 2 via the NFC interface 12 as shown in FIG. 2 or between the controller 13 and the message processor 14 via the NFC interface 12 as shown in FIG. 3.

Thus, if the wireless communication device 2 is an IC card storing e-money, the controller 13 reads the balance of e-money stored in the wireless communication device 2 via the NFC interface 12 and displays the balance on a display unit (not shown) of the cellular telephone 1, thereby allowing the user to check the balance of e-money stored in (charged to) the wireless communication device 2 by using the cellular telephone 1.

Figure 4:
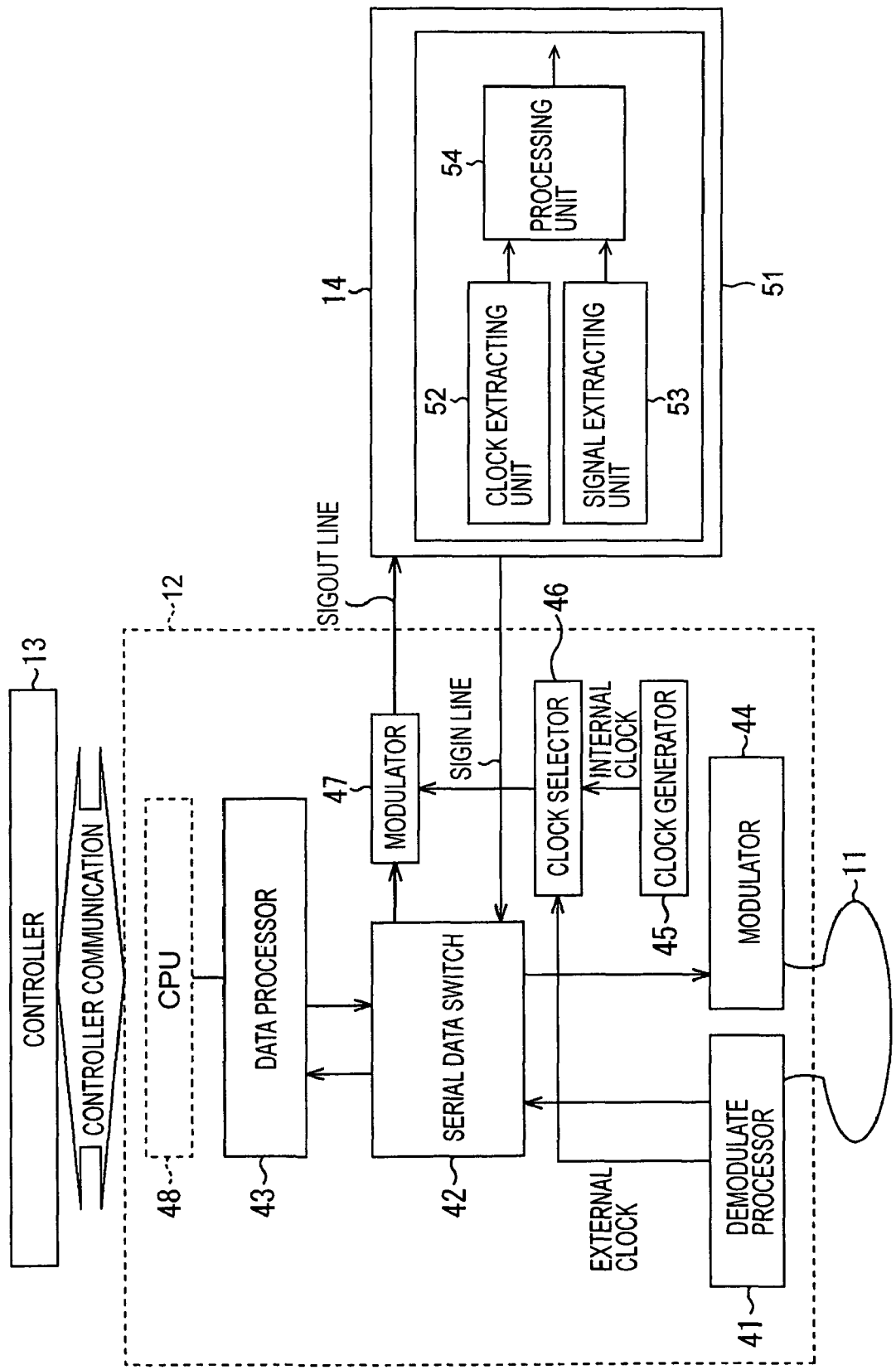
FIG. 4 is a block diagram illustrating an example of configuration of an NFC interface and the message processor.

FIG. 4 illustrates an example of the configuration of the NFC interface 12 and the message processor 14 shown in FIG. 1. In FIG. 4, among the SIGOUT line, SIGIN line, and GND line for connecting the NFC interface 12 and the message processor 14, the GND line is not shown.

In the NFC interface 12, a demodulate processor 41 is connected to the antenna 11 to detect a current flowing in the antenna 11, and further detects the RF field formed by electromagnetic waves generated by another device. The demodulate processor 41 also tunes the current flowing in the antenna 11 and extracts an information signal to amplify the resulting signal by conducting, for example, amplitude shift keying (ASK) demodulation. As a result, the signal can be demodulated. The demodulate processor 41 then supplies the demodulated signal, for example, Manchester codes (signal corresponding to data), to a serial data switch 42.

The demodulate processor 41 also generates a clock (clock signal) (external clock) having a frequency of 13.56 MHz, which is a carrier frequency, adopted in NFCIP-1 by tuning the current flowing in the antenna 11 and extracting an information signal, and supplies the generated clock to a clock selector 46.

The serial data switch 42 supplies the Manchester codes received from the demodulate processor 41 to a data processor 43 or a modulator 47. The serial data switch 42 also supplies Manchester codes received from the data processor 43 to a modulator 44 or the modulator 47. The serial data switch 42 also supplies Manchester codes received from the message processor 14 through the SIGIN line as a SIGIN signal to the data processor 43 or the modulator 44.

The data processor 43 codes data by using a predetermined coding method and also decodes data coded with a predetermined coding method. More specifically, the data processor 43 codes data supplied from the controller 13 via a central processing unit (CPU) 48 into Manchester codes and supplies the Manchester codes to the serial data switch 42. The data processor 43 also decodes Manchester codes supplied from the serial data switch 42 and supplies the resulting data to the controller 13 via the CPU 48.

Although in the data processor 43 Manchester coding/decoding is used, another type of coding/decoding, for example, modified Miller coding/decoding or non-return-to-zero (NRZ) coding/decoding, may be employed.

In the passive mode, the modulator 44 changes the impedance when an external source views the coil, which serves as the antenna 11, in accordance with the signal (for example, Manchester codes) supplied from the serial data switch 42. In this case, if an RF field (magnetic field) is formed around the antenna 11 by electromagnetic waves output from another device (for example, the wireless communication device 2 shown in FIG. 1) as a carrier wave, the RF field is changed in response to a change in the impedance. Then, the carrier wave as electromagnetic waves output from the wireless communication device 2 is modulated (load-modulated) in accordance with the signal supplied from the serial data switch 42, and then, the signal (Manchester codes) from the serial data switch 42 is sent to the wireless communication device 2 that continues outputting electromagnetic waves.

In the active mode, the modulator 44 generates electromagnetic waves as a carrier wave by allowing a current to flow in the antenna 11, and then modulates the carrier wave by the signal supplied from the serial data switch 42 to output the electromagnetic waves as a modulated signal.

As the modulation method used in the modulator 44, ASK modulation may be employed. However, the modulation method is not restricted to ASK modulation, and another modulation, for example, phase shift keying (PSK) modulation or quadrature amplitude modulation (QAM), may be employed. In NFCIP-1, the modulation factor of ASK modulation is 8% to 30%.

A clock generator 45 integrates a quarts oscillator or a ceramic oscillator therein, and generates a clock (internal clock) having a frequency similar to that of the carrier wave employed in NFCIP-1 to supply the clock to the clock selector 46.

The clock selector 46 selects one of the external clock supplied from the demodulate processor 41 and the internal clock supplied from the clock generator 45, and outputs the selected clock to the modulator 47 and the necessary blocks of the NFC interface 12.

More specifically, when an external clock is supplied from the demodulate processor 41, that is, when an NFC device, such as the wireless communication device 2, is located near the NFC interface 12 (cellular telephone 1) and an RF field is formed by the presence of the NFC device, the clock selector 46 selects the external clock supplied from the demodulate processor 41. On the other hand, when an external clock is not supplied from the demodulate processor 41, that is, when an RF field is not formed since an NFC device, such as the wireless communication device 2, is not located near the NFC interface 12, the clock selector 46 selects the internal clock supplied from the clock generator 45.

The modulator 47 performs ASK modulation on the clock output from the clock selector 46 by using Manchester codes supplied from the serial data switch 42, that is, a signal corresponding to data to be sent from the serial data switch 42 to the message processor 14, as a signal to be modulated (hereinafter referred to as a "a modulation subject signal"), and outputs the resulting modulated signal to the SIGOUT line as a SIGOUT signal.

The CPU 48 performs processing on the data if necessary to output the processed data to the data processor 43 or the controller 13. It is not essential that the NFC interface 12 be provided with the CPU 48.

The message processor 14 includes a signal processor 51. The signal processor 51 includes a clock extracting unit 52, a signal extracting unit 53, and a processing unit 54.

The clock extracting unit 52 extracts the clock from the modulated signal (SIGOUT signal) sent from the modulator 47 via the SIGOUT line and supplies the extracted clock to the processing unit 54 and necessary blocks of the message processor 14.

The signal extracting unit 53 extracts the modulation subject signal (Manchester codes) from the modulated signal (SIGOUT signal) sent from the modulator 47 via the SIGOUT line and supplies the extracted modulation subject signal to the processing unit 54.

The processing unit 54 decodes the Manchester codes supplied from the signal extracting unit 53 in accordance with the clock (in synchronization with the clock) extracted by the clock extracting unit 52, and stores the decoded data. The processing unit 54 also codes the stored data into Manchester codes in accordance with the clock extracted by the clock extracting unit 52, and outputs the coded data to the SIGIN line as a SIGIN signal to be sent to the NFC interface 12.

Then, the SIGIN signal is sent from the message processor 14 to the NFC interface 12 through the SIGIN line.

In operation, the NFC interface 12 may receive power from batteries (not shown) of the cellular telephone 1 (FIG. 1). Alternatively, the NFC interface 12 may obtain power by using the demodulate processor 41 by rectifying a current flowing in the antenna 11 by an RF field formed by an NFC device, such as the wireless communication device 2, located near the NFC interface 12.

Alternatively, the NFC interface 12 may be operated by a combination of batteries of the cellular telephone 1 and a current flowing in the antenna 11 by the presence of an NFC device. More specifically, if the remaining capacity of batteries of the cellular telephone 1 is greater than or equal to a predetermined threshold, the NFC interface 12 may be operated by the batteries. If the remaining capacity of the batteries is smaller than the threshold, the NFC interface 12 may be operated by using power obtained from a current flowing in the antenna 11 by the formation of an RF field.

In the NFC interface 12 and the message processor 14 configured as described above, when sending data from the NFC interface 12 to the message processor 14, the modulator 47 of the NFC interface 12 modulates the clock output from the clock selector 46 by using Manchester codes to be sent to the message processor 14 as a modulation subject signal, and sends the resulting modulated signal to the message processor 14 as the SIGOUT signal through the SIGOUT line.

In the message processor 14, the signal processor 51 receives the SIGOUT signal through the SIGOUT line and supplies the SIGOUT signal to the clock extracting unit 52 and the signal extracting unit 53. The clock extracting unit 52 extracts the clock from the SIGOUT signal and supplies the extracted clock to the processing unit 54. The signal extracting unit 53 extracts the Manchester codes from the SIGOUT signal as the modulation subject signal and supplies the extracted Manchester codes to the processing unit 54. The processing unit 54 processes the Manchester codes supplied from the signal extracting unit 53 in synchronization with the clock supplied from the clock extracting unit 52, and more specifically, the processing unit 54 decodes the Manchester codes and stores them if necessary.

When sending data from the message processor 14 to the NFC interface 12, the modulator 47 of the NFC interface 12 sends the SIGOUT signal generated by modulating the clock output from the clock selector 46 by using the output from the serial data switch 42 to the message processor 14 through the SIGOUT line. In this case, if data (Manchester codes) is not output from the serial data switch 42, the modulator 47 sends the clock itself from the clock selector 46 to the message processor 14. In the message processor 14, the clock extracting unit 52 extracts the clock from the SIGOUT signal and supplies the extracted clock to the processing unit 54.

The processing unit 54 outputs Manchester codes to be sent to the NFC interface 12 to the SIGIN line as the SIGIN signal in synchronization with the clock output from the clock extracting unit 52.

More specifically, the processing unit 54 reads data to be sent to the NFC interface 12, and codes the data into Manchester codes if they have not been coded. The processing unit 54 then outputs the Manchester codes to the SIGIN line as the SIGIN signal. Then, the data can be sent from the message processor 14 to the NFC interface 12 through the SIGIN line.

In the NFC interface 12, the serial data switch 42 receives the SIGIN signal (Manchester codes) sent from the message processor 14 as described above.

Figure 5:
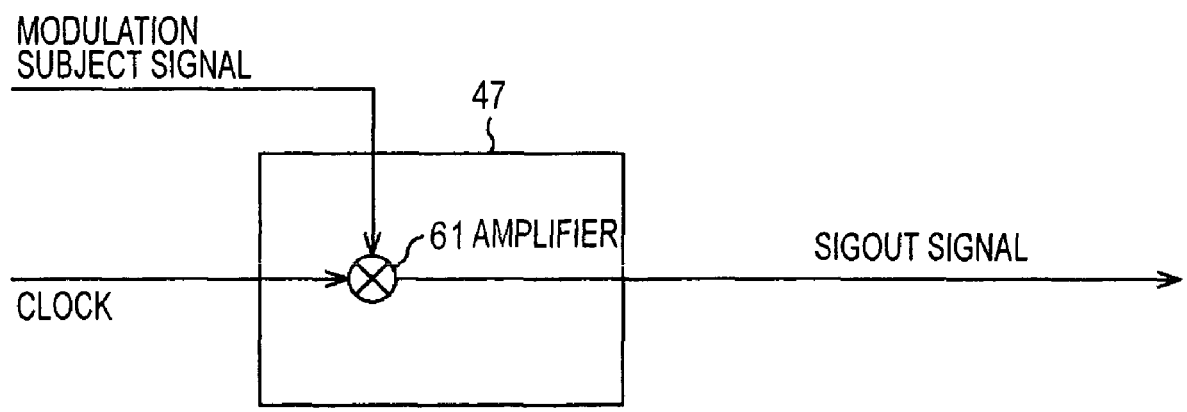
FIG. 5 is a block diagram illustrating an example of the configuration of a modulator of the NFC interface.

FIG. 5 illustrates an example of the configuration of the modulator 47 shown in FIG. 4.

As discussed above, the modulator 47 receives Manchester codes as a signal to be sent from the serial data switch 42 to the message processor 14 and the clock output from the clock selector 46.

The modulator 47 includes an amplifier 61. The amplifier 61 amplifies the clock output from the clock selector 46 in accordance with the Manchester codes (signal) supplied from the serial data switch 42 to perform ASK modulation on the clock by using the Manchester codes as the modulation subject signal. The amplifier 61 then outputs the ASK-modulated signal to the SIGOUT line as the SIGOUT signal.

In the modulator 47, the ASK modulation factor is 8% to 30%, which is adopted in NFCIP-1 as the modulation factor of carrier ASK modulation. However, the modulation factor is not restricted to 8% to 30%, and may be any value that allows the clock extracting unit 52 of the message processor 14 to extract the clock with high precision.

Figure 6:
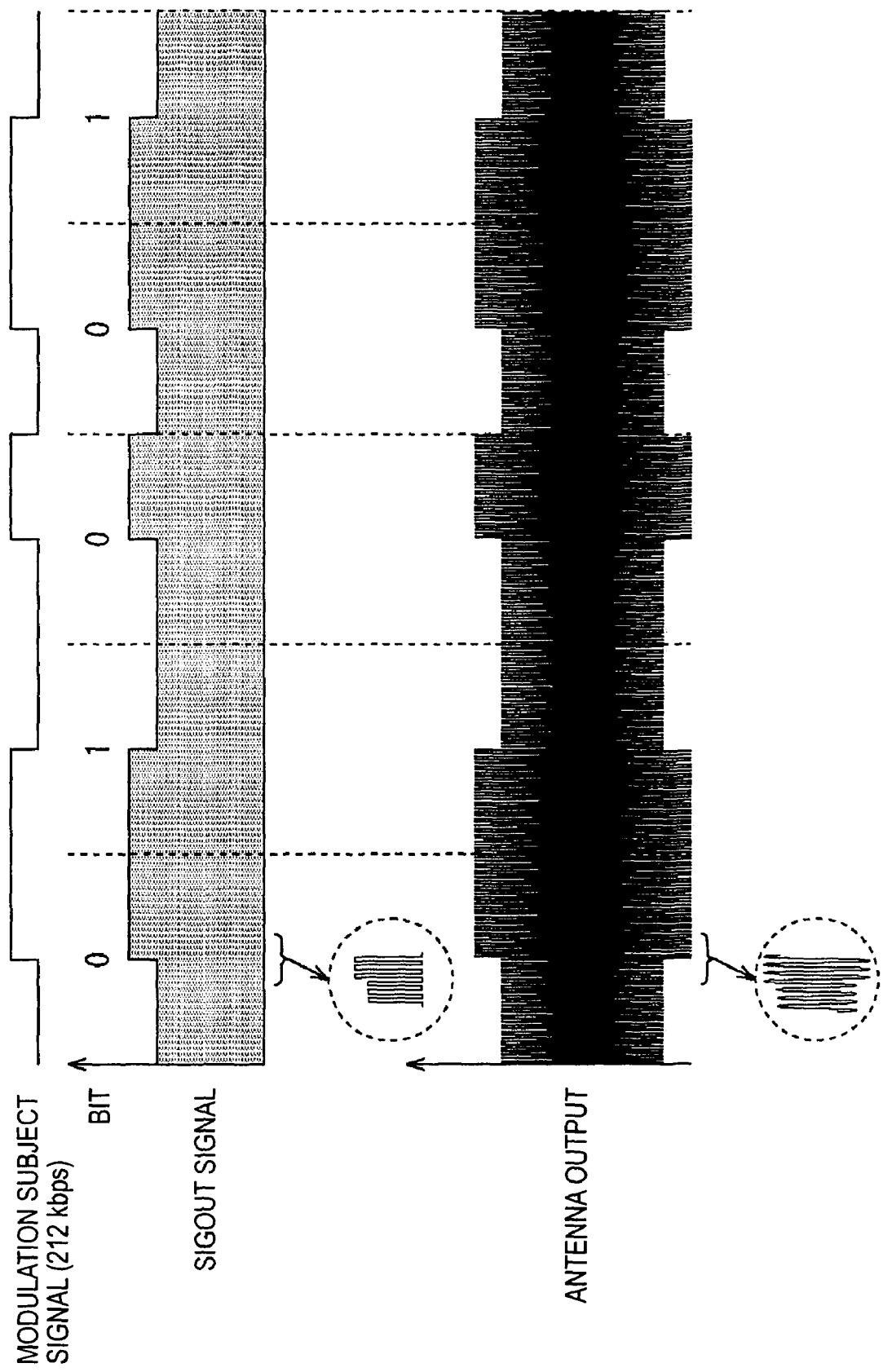
FIG. 6 is a waveform diagram illustrating a modulation subject signal supplied to the modulator and a SIGOUT signal output from the modulator.

FIG. 6 illustrates an example of the modulation subject signal supplied to the amplifier 61 of the modulator 47 shown in FIG. 5 and an example of the modulated signal output from the modulator 47 as the SIGOUT signal. In FIG. 6, the horizontal axis represents the time, and the vertical axis designates the amplitude. The same applies to FIGS. 7 and 9.

The first section from the top in FIG. 6 illustrates an example of the modulation subject signal. The modulation subject signal is Manchester codes, and more precisely, a signal corresponding to data (bits) before being coded into Manchester codes. More specifically, when the data indicates 0 (binary), the Manchester code change from the low (L) level to the high (H) level. When the data indicates 1 (binary), the Manchester codes change from the H level to the L level.

The second section from the top in FIG. 6 illustrates an example of the modulated signal (SIGOUT signal) generated by modulating a pulse train as the clock by using the modulation subject signal indicated in the first section in FIG. 6.

When the modulation subject signal is at the H level, the amplifier 61 of the modulator 47 amplifies the clock by a factor of 1, and when the modulation subject signal is at the L level, the amplifier 61 amplifies the clock by a factor greater than 0 and smaller than 1 (for example, the factor from 0.92 to 0.7).

The third section from the top in FIG. 6 illustrates a waveform of a current (modulated signal) flowing in the antenna 11 when the modulator 44 modulates a sine wave as a carrier by the modulation subject signal indicated in the first section in FIG. 6.

As discussed above, the modulator 44 performs ASK modulation on the carrier by using the Manchester codes obtained by coding the data. In both the modulators 44 and 47, the modulation subject signal is the Manchester codes, and the modulation method is ASK modulation. Accordingly, the current (modulated signal) flowing in the antenna 11 generated by performing modulation by the modulator 44 is similar to the SIGOUT signal (modulated signal) obtained by performing modulation by the modulator 47, except that the types of signals modulated by the modulation subject signal are different, i.e., the carrier and the clock.

If the frequency of the clock output from the clock selector 46 (FIG. 4) is 13.56 MHz and if the transmission rate of the Manchester codes supplied from the serial data switch 42 to the modulator 47 is 212 kbps, there are about 64 pulses in one symbol (one bit) of the data (≈13.56 MHz/212 kbps).

Figure 7:
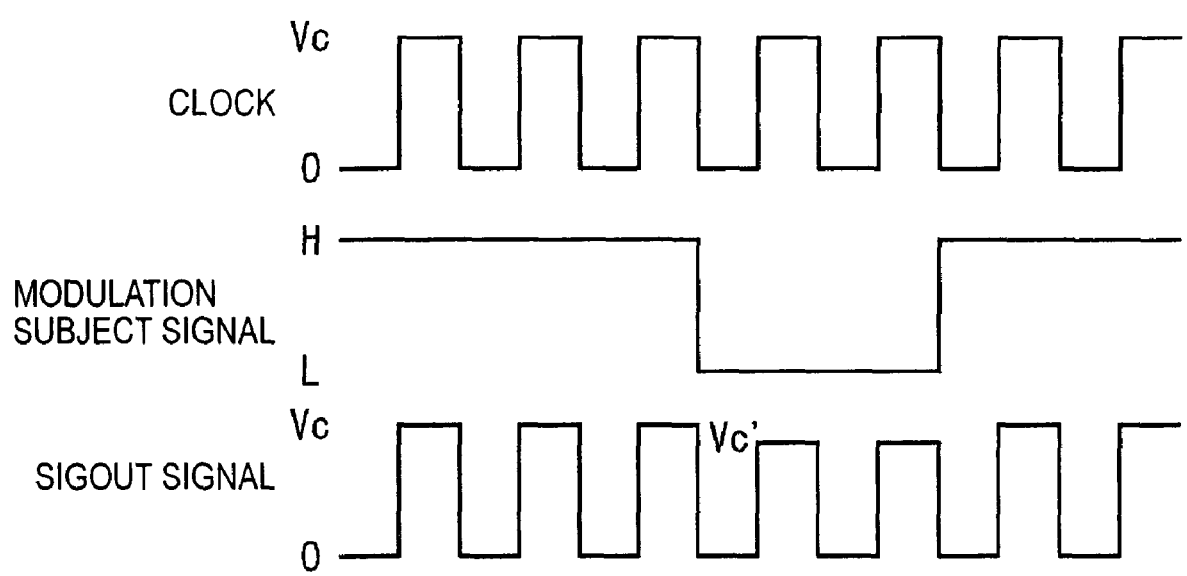
FIG. 7 schematically illustrates the modulation subject signal and the SIGOUT signal (modulated signal).

FIG. 7 is an enlarged view illustrating part of the modulation subject signal and the SIGOUT signal (modulated signal) shown in FIG. 6.

The first section from the top in FIG. 7 illustrates the clock supplied from the clock selector 46 to the modulator 47. The second section from the top in FIG. 7 illustrates the modulation subject signal (Manchester codes) supplied from the serial data switch 42 to the modulator 47. The third section from the top in FIG. 7 illustrates the SIGOUT signal (modulated signal) obtained by performing ASK modulation on the clock indicated in the first section by the modulation subject signal indicated in the second section.

It is now assumed that the minimum voltage and the maximum voltage of the clock pulses shown in the first section is 0 V and Vc V, respectively. In this case, when the modulation subject signal is at the H level, the voltage of the SIGOUT signal is Vc V, as indicated in the third section. When the modulation subject signal is at the L level, the voltage of the SIGOUT signal is Vc' V, which is larger than 0 V and smaller than Vc V, as indicated in the third section.

FIG. 7 shows that, after ASK modulation is conducted on the clock by the modulation subject signal, the rising edges and the falling edges of the clock of the resulting SIGOUT signal can be maintained although the levels thereof are different from those of the clock.

Figure 8:
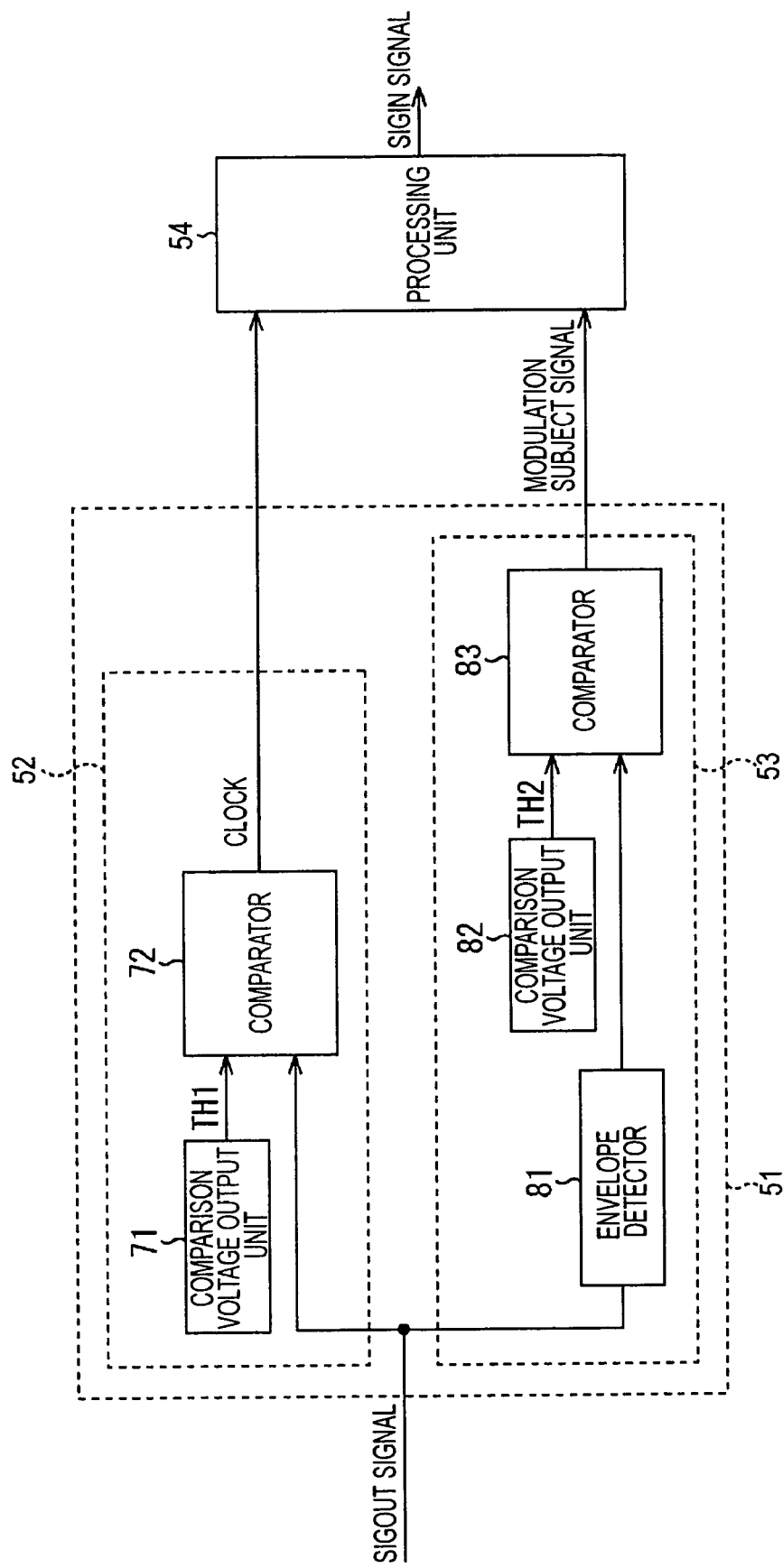
FIG. 8 is a block diagram illustrating an example of the configuration of a clock extracting unit and a signal extracting unit.

FIG. 8 illustrates an example of the configuration of the clock extracting unit 52 and the signal extracting unit 53 shown in FIG. 4.

The clock extracting unit 52 includes a comparison voltage output unit 71 and a comparator 72.

The comparison voltage output unit 71 outputs a predetermined threshold TH1, which is a voltage to be compared with the SIGOUT signal supplied from the NFC interface 12 through the SIGOUT line, to the comparator 72.

In this case, if the voltage of the SIGOUT signal takes three values, such as 0, Vc', and Vc, as indicated in the third part in FIG. 7, the predetermined threshold TH1 is greater than 0 and smaller than Vc', for example, Vc'/2.

The comparator 72 compares the SIGOUT signal supplied from the NFC interface 12 through the SIGOUT line with the threshold TH1 supplied from the comparison voltage output unit 71 to extract and output the clock from the SIGOUT signal.

More specifically, upon comparing the SIGOUT signal with the threshold TH1, if the SIGOUT signal is greater than or equal to the threshold TH1, the comparator 72 outputs the H level, and if the SIGOUT signal is smaller than the threshold TH1, the comparator 72 outputs the L level, thereby extracting the clock indicated in the first part in FIG. 7 from the SIGOUT signal indicated in the third part in FIG. 7.

As stated above, since, in the SIGOUT signal, the rising edges and the falling edges of the clock can be maintained, the clock can be obtained easily and precisely only by comparing the SIGOUT signal with the threshold TH1.

The signal extracting unit 53 includes an envelope detector 81, a comparison voltage output unit 82, and a comparator 83.

The envelope detector 81 detects the envelope of the SIGOUT signal supplied from the NFC interface 12 through the SIGOUT line and supplies the resulting envelope signal to the comparator 83.

The comparison voltage output unit 82 outputs a predetermined threshold TH2, which is a voltage to be compared with the envelope signal supplied from the envelope detector 81, to the comparator 83.

In this case, if the voltage of the SIGOUT signal takes three values, such as 0, Vc', and Vc, as indicated in the third part in FIG. 7, the predetermined threshold TH2 is greater than Vc' and smaller than Vc, for example, the average of Vc' and Vc.

The comparator 83 compares the envelope signal supplied from the envelope detector 81 with the threshold TH2 supplied from the comparison voltage output unit 82 to extract and output the modulation subject signal from the SIGOUT signal.

More specifically, upon comparing the envelope signal with the threshold TH2, if the envelope signal is greater than or equal to the threshold TH2, the comparator 83 outputs the H level, and if the envelope signal is smaller than the threshold TH2, the comparator 83 outputs the L level, thereby extracting the modulation subject signal indicated in the second part in FIG. 7 from the envelope signal of the SIGOUT signal indicated in the third part in FIG. 7.

The SIGOUT signal is a modulated signal generated by modulating the clock by the modulation subject signal, as stated above. Accordingly, by obtaining and comparing the envelope of the SIGOUT signal with the threshold TH2, the SIGOUT signal can be demodulated into the modulation subject signal easily and precisely.

Figure 9:
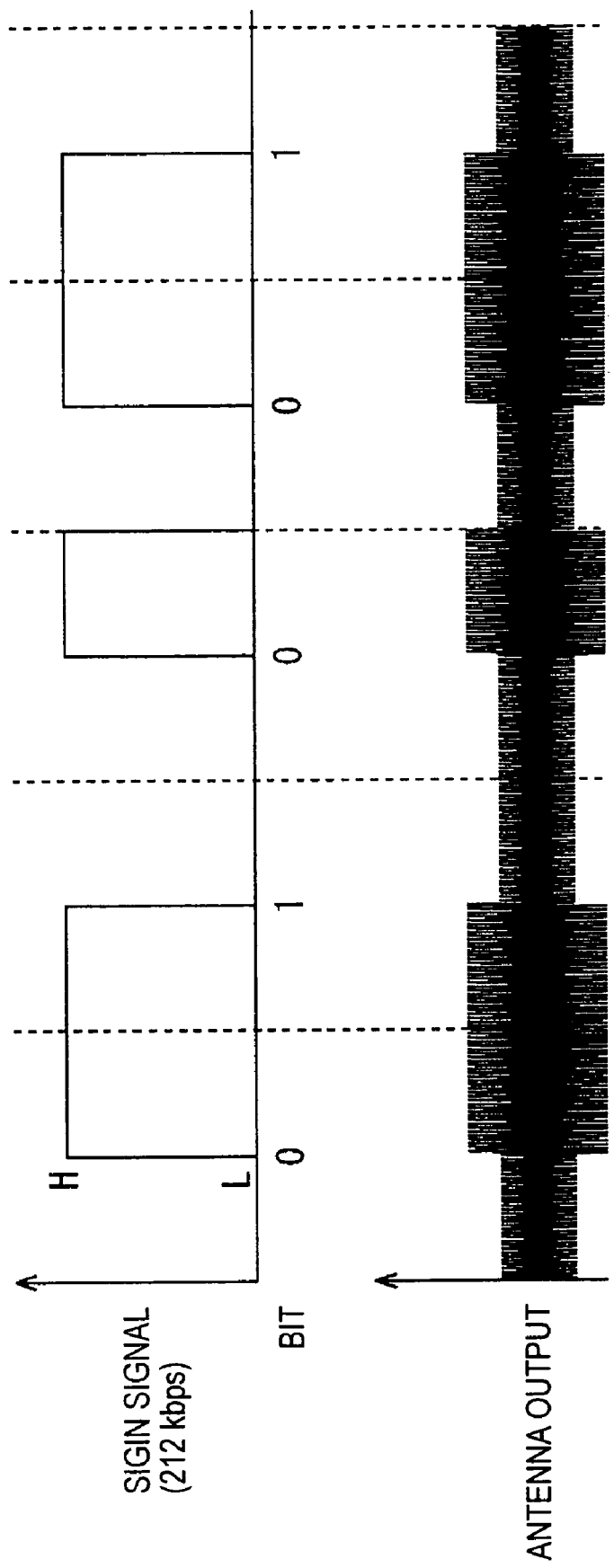
FIG. 9 is a waveform diagram illustrating a SIGIN signal.

FIG. 9 illustrates the SIGIN signal to be output to the SIGIN line by the processing unit 54 shown in FIG. 4.

The first part from the top in FIG. 9 illustrates an example of the SIGIN signal. As stated above, as in the modulation subject signal supplied from the serial data switch 42 to the modulator 47, the SIGIN signal is a signal obtained by coding data into Manchester codes. When the corresponding data indicates 0 (binary), the SIGIN signal changes from the L level to the H level, and when the corresponding data indicates 1 (binary), the SIGIN signal changes from the H level to the L level.

As discussed above, the modulator 44 (FIG. 4) modulates the carrier by Manchester codes. Accordingly, if the SIGIN signal, which is Manchester codes, is sent from the message processor 14, the serial data switch 42 can directly supply the SIGIN signal to the modulator 44 so that the SIGIN signal can be sent to an NFC device, such as the wireless communication device 2, by near field communication.

More specifically, the second part from the top in FIG. 9 illustrates the waveform of a current (modulated signal) flowing in the antenna 11 when the SIGIN signal indicated in the first part from the top in FIG. 9 is directly supplied to the modulator 44 and is used for modulating electromagnetic waves, which are the carrier, by the modulator 44.

A description is now given, with reference to FIG. 10, of wired communication performed between the NFC interface 12 and the message processor 14 shown in FIG. 4.

Upon receiving Manchester codes to be sent to the message processor 14 from the demodulate processor 41 or the data processor 43, the serial data switch 42 of the NFC interface 12 supplies the Manchester codes to the modulator 47 as the modulation subject signal.

In step S1, the modulator 47 modulates the clock output from the clock selector 46 by the Manchester codes supplied from the serial data switch 42 as the modulation subject signal, and sends the resulting modulated signal to the message processor 14 through the SIGOUT line as the SIGOUT signal.

In step S11, the message processor 14 receives the SIGOUT signal sent from the modulator 47 of the NFC interface 12 through the SIGOUT line, and supplies the SIGOUT signal to the clock extracting unit 52 and the signal extracting unit 53.

Then, in step S12, the clock extracting unit 52 extracts the clock from the SIGOUT signal, and the signal extracting unit 53 extracts the Manchester codes from the SIGOUT signal as the modulation subject signal. The clock extracting unit 52 then supplies the extracted clock to the processing unit 54, and the signal extracting unit 53 then supplies the extracted Manchester codes to the processing unit 54 as the modulation subject signal.

In step S13, the processing unit 54 processes the Manchester codes supplied from the signal extracting unit 53 in synchronization with the clock supplied from the clock extracting unit 52.

Then, in step S14, the processing unit 54 sends Manchester codes to be sent to the NFC interface 12 to the NFC interface 12 through the SIGIN line as the SIGIN signal.

In step S2, the serial data switch 42 of the NFC interface 12 receives the SIGIN signal, which are the Manchester codes sent from the processing unit 54 of the message processor 14 as described above, and supplies the received SIGIN signal to the data processor 43 or the modulator 44.

If the Manchester codes as the SIGIN signal are supplied to the data processor 43 from the serial data switch 42, the data processor 43 decodes the Manchester codes into the original data, and supplies the decoded data to the controller 13. If the Manchester codes as the SIGIN signal are supplied to the modulator 44 from the serial data switch 42, the modulator 44 modulates electromagnetic waves, which is the carrier, by using the Manchester codes, thereby sending the data corresponding to the Manchester codes as the SIGIN signal to the NFC device that generates the electromagnetic waves.

The modulator 47 continues sending the SIGOUT signal throughout wired communication performed between the NFC interface 12 and the message processor 14. Accordingly, if there is no data to be sent from the NFC interface 12 to the message processor 14, the clock itself output from the clock selector 46 is sent to the message processor 14 from the modulator 47 as the SIGOUT signal.

As described above, ASK modulation is conducted on the clock by using the modulation subject signal (Manchester codes), and the SIGOUT signal, which is the resulting modulated signal, is sent to the message processor 14 from the NFC interface 12 through the SIGOUT line. Accordingly, by sending the SIGOUT signal, both the data and the clock can be sent from the NFC interface 12 to the message processor 14.

That is, it is possible to send data and also supply a clock from the NFC interface 12 to the message processor 14 by using a single connecting line, i.e., the SIGOUT line. This eliminates the need to connect the NFC interface 12 and the message processor 14 by a connecting line dedicated for supplying a clock from the NFC interface 12 to the message processor 14.

It would be possible that, instead of supplying a clock from the NFC interface 12 to the message processor 14, a clock generator similar to the clock generator 45 (FIG. 4) be contained in the message processor 14 so that the message processor 14 can be operated in synchronization with a clock generated by the built-in clock generator.

In this case, however, it is necessary to integrate a quartz oscillator for generating a clock into the clock generator, which increases the size of the message processor 14.

If the message processor 14 is formed as a SIM card or a UIM card, it should be formed as a small device since a SIM card or a UIM card is small, as stated above. Thus, integrating a clock generator into the message processor 14 is not suitable.

It is thus necessary to supply a clock to the message processor 14 from an external source. However, if a clock is independently supplied to the message processor 14, a terminal to be connected to a line dedicated for supplying a clock should be provided for the message processor 14.

However, if the message processor 14 is formed as a SIM card, as stated above, it is desirable that the number of lines to be connected to the SIM card be minimized since the number of terminals provided for the SIM card is limited.

As discussed above, ASK modulation is conducted on the clock by using the modulation subject signal (Manchester codes), and the resulting modulated signal is sent to the message processor 14 from the NFC interface 12 through the SIGOUT line as the SIGOUT signal. This eliminates the need to provide a connecting line dedicated for supplying a clock from the NFC interface 12 to the message processor 14. As a result, the NFC interface 12 and the message processor 14 can be connected to each other with a minimum number of connecting lines.

Additionally, since the SIGOUT signal is a signal obtained by performing ASK modulation on the clock, the rising edges (positive edges) and the falling edges (negative edges) can be maintained as they are although the levels thereof are different. Accordingly, the message processor 14 can easily extract the clock having a duty ratio of 50 merely by comparing the SIGOUT signal with a predetermined threshold.

Since the SIGOUT signal contains data (Manchester codes) having different levels, the message processor 14 can easily extract the data by detecting the envelope of the SIGOUT signal and by comparing the envelope with a predetermined threshold.

That is, the message processor 14 can extract the clock and data from the SIGOUT signal with a simple circuit configuration.

Thus, wired communication can be performed between the NFC interface 12 that can perform both wireless communication and wired communication, such as a communication interface for an IC card, and the message processor 14 that performs wired communication, such as a SIM card, by a simple configuration of the devices (circuit) by minimizing the number of lines for connecting the NFC interface 12 and the message processor 14.

According to NFCIP-1, data can be sent at various transmission rates, such as 106 kbps, 212 kbps, and 424 kbps. Whichever transmission rate is used for performing ASK modulation on a clock by data (Manchester codes), the circuit configuration of the NFC interface 12 and the message processor 14 remains the same. That is, it is not necessary to change the circuit configuration of the NFC interface 12 and the message processor 14 depending on the transmission rate.

The SIGIN signal sent from the message processor 14 to the NFC interface 12 is Manchester codes, i.e., a signal obtained by coding data by a coding method which is used when performing wireless communication between the NFC interface 12 and an NFC device. This allows the NFC interface 12 to modulate electromagnetic waves, which are a carrier, by using the SIGIN signal sent from the message processor 14 as it is and to send the modulated signal to the NFC device.

Signals sent and received by the NFC interface 12 by wireless communication are signals obtained by performing ASK modulation on a carrier by using Manchester codes (modulation subject signal). In contrast, the SIGOUT signal is a signal obtained by performing ASK modulation on a clock by using Manchester codes, and the SIGIN signal is Manchester codes. Accordingly, the compatibility of signals sent and received by the NFC interface 12 by wireless communication with the SIGOUT signal and the SIGIN signal sent and received between the NFC interface 12 and the message processor 14 is high. Thus, it is not difficult to integrate the circuit of an existing NFC device into the message processor 14. More specifically, an existing NFC device is, for example, an IC card, and the IC card includes, not only an NFC interface similar to the NFC interface 12, but also a tamper-resistant SAM that manages cryptographic keys for conducting authentication or encrypting data. That SAM can be easily integrated into the message processor 14.

Additionally, the SIGIN line used for sending data (SIGIN signal) from the message processor 14 to the NFC interface 12 and the SIGOUT line used for sending data (SIGOUT signal) from the NFC interface 12 to the message processor 14 are physically different connecting lines. Accordingly, the NFC interface 12 and the message processor 14 can be designed without precisely taking impedance changes into consideration, which would otherwise be necessary when sending signals from a communication interface to a SIM card and vice versa by using a single line, as discussed above. As a result, wired communication can become more stable.

In the above-described embodiment, as the communication device that can perform both wired communication and wireless communication, the NFC interface 12, which serves as a communication interface performing wireless communication according to NFCIP-1, is used. However, another communication interface performing wireless communication according to the standards other than NFCIP-1 may be used.

Additionally, although in this embodiment the message processor 14, which serves as a wired communication device, is formed as a SIM card or a UIM card, it may be configured as another type of device.

The foregoing embodiment has been described in the context of a communication system including a cellular telephone. However, this is an example only, and the present invention is applicable to a device that can integrate therein a communication interface that can perform both wireless communication, in particular, near field communication, and wired communication.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication system comprising:
 a communication device; and
 a wired communication device connected to the communication device by a first connecting line and a second connecting line;
 the communication device including:
  (a) a first processor;
  (b) a first memory device storing first instructions, which when executed by the first processor cause the first processor to:
   (i) output a clock;
   (ii) generate a resulting modulated signal by performing amplitude shift keying modulation on the clock using a modulation subject signal to be sent to the wired communication device;
   (iii) output, via said first connecting line, said resulting modulated signal to said wired communication device; and
   (iv) communicate with a near field communication device that performs near field communication in at least one of an active mode and a passive mode, the near field communication device being different from the communication device and the wired communication device;
 the wired communication device including:
  (a) a second processor;

(b) at least one of a subscriber identity module and a user identity module; and
(c) a second memory device storing second instructions, which when executed by the second processor cause the second processor to:
  (i) extract the clock from the modulated signal sent from the first connecting line;
  (ii) extract the modulation subject signal from the modulated signal sent from the first connecting line;
  (iii) decode the extracted modulation subject signal in accordance with the extracted clock;
  (iv) code stored data in accordance with the extracted clock; and
  (v) output, via said second connecting line, said coded data to the communication device.

2. A communication device comprising: a first processor; and a first memory device storing first instructions, which when executed by the first processor cause the first processor to:
(a) output a clock;
(b) generate a resulting modulated signal by performing amplitude shift keying modulation on the clock using a modulated subject signal to be sent to a wired communication device;
(c) output, via a first connecting line, said resulting modulated signal;
(d) communicate with a near field communication device that performs near field communication in at least one of an active mode and a passive mode; and
(e) communicate with the wired communication device, the wired communication device being different from the near field communication device, the wired communication device including:
  (i) a second processor;
  (ii) at least one of a subscriber identity module and a user identity module; and
  (iii) a second memory device storing second instructions, which when executed by the second processor cause the second processor to:
    (A) extract the clock from the modulated signal sent from the first connecting line;
    (B) extract the modulation subject signal from the modulated signal sent from the first connecting line;
    (C) decode the extracted modulation subject signal in accordance with the extracted clock;
    (D) code stored data in accordance with the extracted clock; and
    (E) output, via a second connecting line, data to the first processor.

3. The communication device of claim 2, wherein when executed by the first processor, the first instructions cause the first processor to send, to the near field communication device, data by modulating a carrier wave by using a signal obtained by coding data according to a predetermined coding method, wherein: (a) the modulation subject signal is a signal obtained by coding data according to the predetermined coding method; and (b) the signal corresponding to the data sent from the wired communication device is also a signal obtained by coding the data according to the predetermined coding method.

4. A method of operating a communication device storing first instructions, the method comprising:

(a) outputting, by a first processor which executes the first instructions, a clock;
(b) generating, by the first processor, a resulting modulated signal by performing amplitude shift keying modulation on the clock using a modulation subject signal to be sent to a wired communication device;
(c) outputting, by the first processor, via a first connecting line, said resulting modulated signal;
(d) communicating, by the first processor, with a near field communication device that performs near field communication in at least one of an active mode and a passive mode; and
(e) communicating, by the first processor, with the wired communication device, said wired communication device including:
  (i) a second processor;
  (ii) at least one of a subscriber identity module and a user identity module; and
  (iii) a second memory device storing second instructions, which when executed by the second processor cause the second processor to:
    (A) extract the clock from the modulated signal sent from the first connecting line;
    (B) extract the modulation subject signal from the modulated signal sent from the first connecting line;
    (C) decode the extracted modulation subject signal in accordance with the extracted clock;
    (D) code stored data in accordance with the extracted clock; and
    (E) output, via a second connecting line, data to the first processor.

5. A wired communication device comprising:
a first processor; and
a first memory device storing first instructions, which when executed by the first processor cause the first processor to:
(a) extract a clock from a modulated signal sent from a first connecting line;
(b) extract a modulation subject signal from the modulated signal sent from the first connecting line;
(c) decode the extracted modulation subject signal in accordance with the extracted clock;
(d) code stored data in accordance with the extracted clock; and
(e) output, via the first connecting line, a signal corresponding to data to be sent to a communication device including:
  (i) a second processor;
  (ii) at least one of a subscriber identity module and a user identity module; and
  (iii) a second memory device storing second instructions, which when executed by the second processor cause the second processor to:
    (A) output the clock; and
    (B) generate a resulting modulated signal by performing amplitude shift keying modulation on the clock using a modulation subject signal to be sent to the wired communication device;
    (C) output, via a second connecting wireline, said resulting modulated signal;
    (D) communicate with a near field communication device that performs near field communication in at least one of an active mode and a passive mode; and
    (E) communicate with the first processor.

6. A method of operating a wired communication device including first instructions, the method comprising:

(a) extracting, by a first processor, a clock from a modulated signal sent from a first connecting line;

(b) extracting, by the first processor, a modulation subject signal from the modulated signal sent from the first connecting line;

(c) decoding, by the first processor, the extracted modulation subject signal in accordance with the extracted clock;

(d) coding, by the first processor, stored data in accordance with the extracted clock; and (e) outputting, by the first processor, via said first connecting line, a signal corresponding to data to be sent to a communication device including:

(i) a second processor;

(ii) at least one of a subscriber identity module and a user identity module; and (iii) a second memory device storing second instructions, which when executed by the second processor cause the second processor to:

(A) output the clock; and (B) generate a resulting modulated signal by performing amplitude shift keying modulation on the clock using a modulation subject signal to be sent to the wired communication device;

(C) output, via a second connecting line, said resulting modulated signal;

(D) communicate with a near field communication device that performs near field communication in at least one of an active mode and a passive mode; and (E) communicate with the first processor.

* * * * *